INVENTORS
ROBERT S. TIMMINS
RICHARD P. deFILIPPI
BY Crowley, Kiely & Stevens
ATTORNEYS

3,518,982
DEVICE AND METHOD FOR MONITORING OF GASES IN THE BLOOD STREAM
Robert S. Timmins, Concord, and Richard P. de Filippi, Weston, Mass., assignors to Abcor, Inc., Cambridge, Mass., a corporation of Massachusetts
Filed Feb. 20, 1968, Ser. No. 706,900
Int. Cl. A61b *19/00*
U.S. Cl. 128—2  12 Claims

ABSTRACT OF THE DISCLOSURE

A gas analyzer device and method for monitoring and determining the quantitative level of gases in a fluid stream and particularly for the automatic measurement of the level of dissolved gases in a liquid stream such as the in vivo monitoring of dissolved gases in the blood stream of a patient.

The device comprises a catheter having a membrane material which permits diffusion therethrough of the gas being monitored into a catheter chamber, a transducer to measure and convert changes in gas pressure in the catheter chamber to a signal, a timer to determine or control the time of the pressure measurements, an inlet and outlet in the catheter to introduce and to remove flush gases of known composition into and from the catheter chamber, control and computation circuitry for storing the signals from the transducer and then performing calculations and a readout device to display the results and show the level of gas in the fluid stream to be analyzed.

BACKGROUND OF THE INVENTION

It is generally acknowledged to be desirable to determine rapidly the level of dissolved gases in a fluid stream without removing a sample for remote analysis. Some examples would be the determination of dissolved oxygen in water or sulfur-containing gases like sulfur dioxide, oxides of nitrogen, carbon monoxide or other contaminants in the atmosphere for pollution control, helium in natural gas streams and other industrial applications. An additional area of major importance is the determination of dissolved gases in blood, both those naturally occurring such as oxygen and carbon dioxide and those added for purposes of anethesia such as ether, cyclopropane and nitrous oxide.

General anesthesia has been accomplished either by direct introduction of the anesthetic gas into the blood stream (see Folkman, Long and Rosenbaum; Science, vol. 156, No. 3745, pp. 148–189 Silicone Rubber: A New Diffusion Property Useful for General Anesthesia) or by more conventional techniques of inhalation of the anesthetic gas by the patient. The anesthetic gases used are normally found after application, as dissolved gas in the blood stream of the patient. It is extremely important that the level of the anesthetic gas in the blood stream of a patient be rapidly and accurately determined particularly before and during any surgical operation.

The percentage of carbon dioxide or oxygen in the blood stream is a function of the particular metabolism of the patient who is under anesthesia. It may also be a function of the level of anesthetic gas in the blood stream, although the level of anesthetic gas can be measured directly. For these and other reasons it is important to determine in vivo the level of gases dissolved in the blood stream.

Most present methods for determining the level of anesthetic gas or any gas in the blood stream are based primarily on determining the partial pressure of the gas under consideration in the blood stream at a given time. Perhaps the most common method used today is to take samples of blood periodically and through laboratory analysis determine the partial pressure or the partial pressures or percentages of the gases under consideration in the blood stream at a remote location from the patient.

In one present method used to determine the in vivo measurement of oxygen ($pO_2$) in blood, an arterial needle which encloses an electrode assembly surrounded by a polyethylene membrane is inserted into a vein or artery. The dissolved oxygen in the blood diffuses through the membrane into an electrolytic solution and is reduced at a platinum cathode. The current produced is proportional to the oxygen content and is converted into a meter reading.

In another method employed to determine the amount of gas in the blood stream the patient breaths in a controlled atmosphere with a predetermined composition of gases. This method has been employed with animals on a research basis and uses a membrane catheter (see Science, supra). In this manner the composition of the gases introduced into the blood stream is known. The catheter having a membrane over the end thereof is inserted into the blood stream and the increase in pressure in the catheter chamber with time is then recorded. Also a sample of blood is taken from the patient and the partial pressures of the gases in the blood stream are determined by laboratory analysis. The procedure is performed a second time with a different composition of gases in the air the patient is breathing. Again a sample of the blood is extracted from the patient to determine the partial pressure of the gases in the blood stream and the increase in pressure in the catheter chamber is determined over the same period of time as in the first instance. These two values determined from the above experiments are then plotted on a graph. The catheter system has now been calibrated for that individual patient and membrane. Accordingly, the catheter can now be left in the vein or artery and over any period of time the pressure increase in the catheter chamber can be recorded and plotted on the graph to determine the percentage of anesthetic gas in the blood stream. These methods require the calibration of the catheter externally to the patient which is subject to certain inherent errors, or rather complex calibrations in vivo.

The relationship of the increase in pressure over a period of time in a catheter chamber and the equilibrium partial pressure of the gas under consideration in the blood stream is dependent upon the geometry of the catheter and the overall mass transport coefficient of the gas diffusing into or out of the catheter chamber. The mass transport coefficient will vary with each particular patient and catheter due to factors effecting any mass transport coefficient through a membrane, for example, the thickness of a particular membrane wall, the effective membrane surface which may vary with the depth of penetration and the position of the catheter in a particular vessel such as an artery or a vein or other factors. The rate of mass transfer will also be controlled by factors such as the boundary layer of blood on the catheter membrane wall which in turn will be influenced by the blood velocity, the blood pressure and the metabolic rate of the patient.

Thus, there is a need for a rapid and effective means to calibrate and/or monitor the level of gases in the blood stream for each particular system i.e. catheter and patient. It is also very desirable to calibrate each catheter for each patient in vivo so that a continuous or intermittent calibration and monitoring of the gases in the blood stream may be determined.

SUMMARY OF THE INVENTION

Our invention relates to a rapid and efficient device for a method of measuring the quantitative level of gases in a fluid stream. In particular, our device in one of its most advantageous and preferred embodiments is directed to the in vivo calibration and monitoring of dissolved gases in blood streams. However, our device and method is also applicable to measuring the gas in the blood after the catheter has been calibrated externally by prior art methods. Further, our device may also be used to introduce anesthetic or other gases into the blood stream and then to monitor and/or calibrate the gas so introduced.

Our gas analyzer device for blood comprises in combination a catheter which includes a membrane through which gases may diffuse into or out of the catheter, a chamber within the catheter and means such as a valve, to isolate gases in the chamber and means to introduce into and to withdraw from the chamber a flush gas; means to convert changes in gas pressure in the enclosed chamber of the catheter into a signal, such as a transducer to convert changes in pressure into electrical signals such as voltage; means to control and determine the time at which pressure determinations and conversions are made, such as by the use of a timer in communication with the transducer; control and computation circuitry such as an analog computer to store and utilize the signals of said pressure determinations at a given time and to calculate and obtain a calibration factor which factor is dependent on the rate of diffusion of the gas through the membrane; and means to display the quantitative level of the gas to be determined to an observer such by the use of a digital readout device. Our device measures changes in the total gas pressure with time within the chamber of the catheter to obtain calibration factors for the system. The calibration factors are then used to determine the quantitative level of the gas in the fluid stream to be analyzed.

Our method of determining the quantitative level of one or more gas components in a fluid stream such as dissolved gases in a blood stream includes the insertion of a catheter having a membrane of a material which is permeable to the gas to be measured in the blood stream. The membrane employed in the catheter should be characterized by having a significant rate of diffusion for at least one gaseous component of the blood stream which is to be analyzed. A gas stream of known composition and pressure, called a flush gas, is then introduced into the catheter and isolated in the chamber. Depending upon the partial pressure differences of the gaseous components on either side of the membrane wall, diffusion through the membrane occurs, which causes the normal pressure within the chamber to change with time. This pressure change is related to the concentration of the gases in the flush gas and in the blood stream to be analyzed. The pressure in the chamber at a given time is then determined, the number of pressure determinations made being at least equal to the number of gas components ($n$) to be analyzed in the blood stream, which components have a significant rate of diffusion through the membrane wall of the catheter. Similar pressure determinations at a given time with additional flush gases of known composition and pressure are made to obtain a series of ($n+1$) pressure determinations. From these pressure determinations the value of the actual characteristic mass transport function of the gas to be analyzed can then be determined; that is the calibration factor. This calibration factor for the patient and catheter is then employed to determine the quantitative level of the dissolved gases in the blood stream continuously or intermittently.

This calibration factor represents the quantitative composition of all of the gas components which have a significant rate of diffusion through the membrane and which are present in the blood stream to be analyzed. The determination of the quantitative level of the gases in the fluid stream to be analyzed is then made by introducing a flush gas of known composition and pressure into the chamber, isolating the flush gas and once again determining the pressure change for a given time. The pressure determination together with the calibration factor previously found permits the device to directly determine the level of the gas in the blood stream.

At least one of the gas components to be analyzed in the fluid stream and at least one of the gas components in flush gas must have significant rate of diffusion through the membrane wall of the catheter. The specific rate of diffusion of a gas will vary depending upon the membrane material, its thickness and gas components. For example, in determining the amount of carbon dioxide in the presence of nitrogen and oxygen dissolved in water through the use of a silicone rubber membrane or other membrane, if nitrogen has a permeation rate of 1, oxygen 6 and carbon dioxide 10, then the oxygen and carbon dioxide have a significant rate of diffusion over that of nitrogen and can be effectively measured with our gas analyzer device. The nitrogen would be considered as a gas which slowly diffuses or does not have a significant rate of diffusion for the purposes of this application.

The flush gas composition employed in our gas analyzer device may be any gas stream of known composition and pressure which contains at least one of the gas components in the stream to be analyzed and which also contains at least one of those components which do not have a significant rate of diffusion through the membrane. For the purposes of illustration only, our gas analyzer device is described in connection with the diffusion of gas from the blood stream into the closed chamber of the catheter, that is, where the partial pressure of the gas component in the flush gas is less than the partial pressure of the gas in the stream to be analyzed so that an increase in total pressure occurs in the closed chamber. However, our gas analyzer device and method may also be employed wherein diffusion of gas components occurs in the reverse direction.

The change in pressure within the closed chamber of the catheter at any given time is sensed by a transducer which converts this pressure change to an electrical signal. This signal is in communication with the control and computation circuitry which carries out the mathematical equations hereafter set forth in determining the calibration factor. The calibration factor is incorporated in the determination of the gas to be analyzed so that a direct reading or monitoring is obtained of the fluid stream to be analyzed if desired, although the calibration factor may be determined by the use of a manometer with all calculations done manually.

As described for pressure determinations with time, there must be ($n+1$) flush gas samples each with at least one of the ($n$) components in order to analyze the fluid containing components. One component, preferably the component having the lowest diffusion rate through the membrane, is present in all of the flush gas samples. In each of the other $n$ samples preferably only one additional gas component is added, a different component in each sample. For example, if carbon dioxide and oxygen are to be monitored in our gas analyzer, the flush gas samples may contain: (1) 100% nitrogen; (2) 90% nitrogen and 10% carbon dioxide; and (3) 90% nitrogen and 10% oxygen. The carbon dioxide and oxygen would have significant rates of diffusion and nitrogen have the lowest rate of diffusion for a silicone rubber membrane.

Our gas analyzer device and method overcomes many of the disadvantages of the prior art by permitting automatic continuous or intermittent in vivo calibration and monitoring of dissolved gases in the blood stream, regardless of the method of administration or source of the gas. For example, anesthetic gases may be given to a patient by direct introduction into the blood stream or by inhalation and thereafter be monitored by our device. Our device and method provides for the measurement of the actual characteristic transient function of mass transfer for each gas having a significant rate of diffusion through the catheter for any system composed of a fluid stream and a membrane device such as a catheter.

Further as set forth, the calibration factor for each gas analyzed may be determined by prior art methods and our device used merely to monitor on a continuous or intermittent basis one or more gaseous components in a fluid stream.

DESCRIPTION OF THE PREFERRED EMBODIMENT

Our device and method will be described in reference to the in vivo determination of the amount of carbon dioxide and oxygen in the blood stream of a patient.

Figure 1:
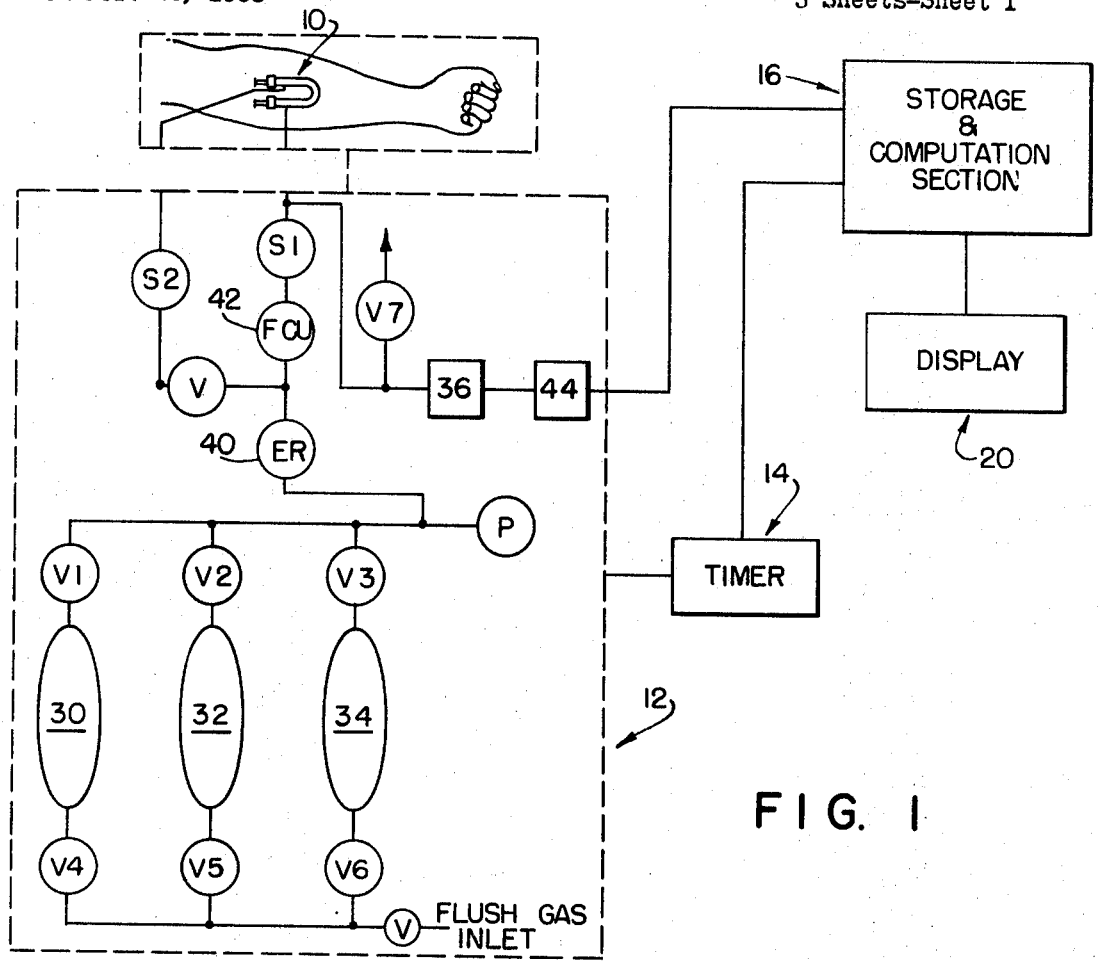
FIG. 1 is a general schematic illustration of our device.

FIG. 1 is a general schematic illustration of our invention showing a catheter 10 inserted into a patient. A gas handling system 12 is in direct communication with the catheter 10 and a timer 14. The timer 14 is also in communication with a storage and computation section shown generally in block form at 16 which section is in communication with a display 20.

Figure 2:
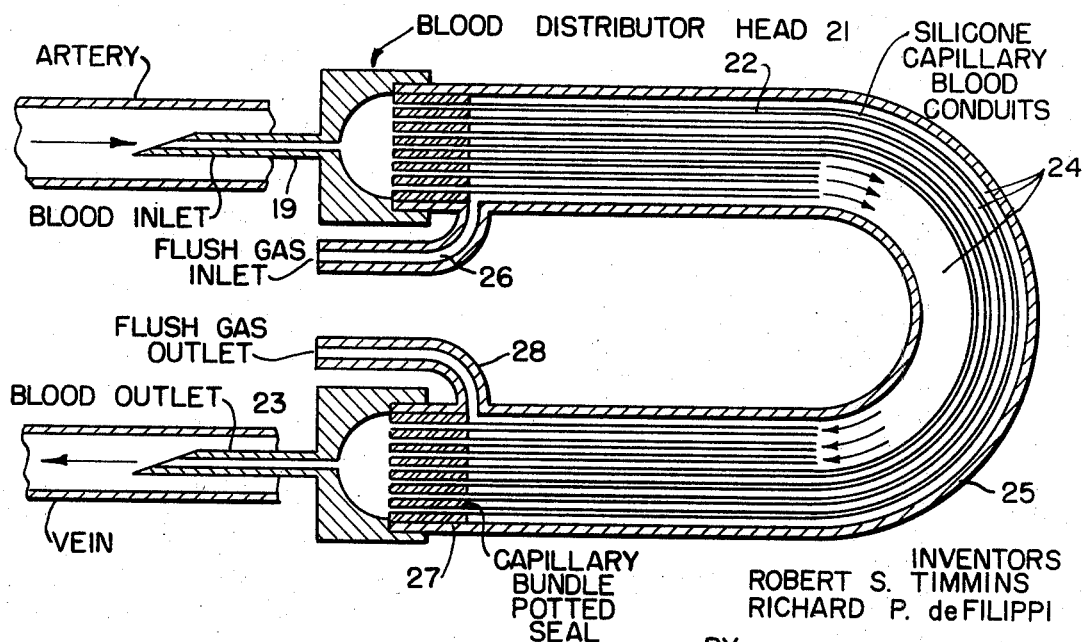
FIG. 2 is a schematic and partial cross-sectional view of the catheter inserted into the arm of a patient for an in vivo blood gas analysis.

The catheter 10 inserted into the blood stream is shown in greater detail in FIG. 2. The catheter comprises of a bundle of capillary membranes 22 inserted into an outer impermeable jacket 25 which forms the catheter chamber 24. The bundle of capillary membranes is sealed to the catheter chamber by a suitable sealing or potting compound 27. This seal segregates the catheter chamber from the flowing fluid to be analyzed. The blood would enter from an artery into a blood distributor head 21 through a blood inlet line 19. The blood would then flow through the capillary blood conduits 22 where the blood is returned to the vein. As the blood flows through the capillary membranes the $CO_2$ and $O_2$ dissolved in the blood permeate the capillary walls and enter the catheter chamber bounded by potted seals 27 and the impermeable tube 25. Flush gas is introduced into the catheter chamber through a flush gas inlet 26 and removed by a flush gas outlet 28.

Referring now to FIG. 1 the gas handling system is comprised of three cylinders, 30, 32 and 34 each of which contains a different flush gas composition. Outlet valves V1 through V3 and inlet valves V4 through V6 are used for the introduction and removal of flush gas compositions into and from the cylinders 30, 32 and 34 respectively. Solenoid valve S1 is in inline communication between the flush gas inlet 26 and the outlet valves V1 through V3 and a transducer 36 is disposed on the upstream of solenoid valve V1. Solenoid valve S2 is disposed on gas outlet tube 28. The solenoid valves when closed isolate the chamber 24. The transducer 36 is responsive to pressure changes in the chamber and converts the pressure changes to voltage. A demodulator 44 receives the signals from the transducer and transmits them to the storage and computation section 16. The pressure regulator 40 and the flow valve 42 are used to regulate the quantity of flush gas entering into the catheter chamber.

Figure 3:
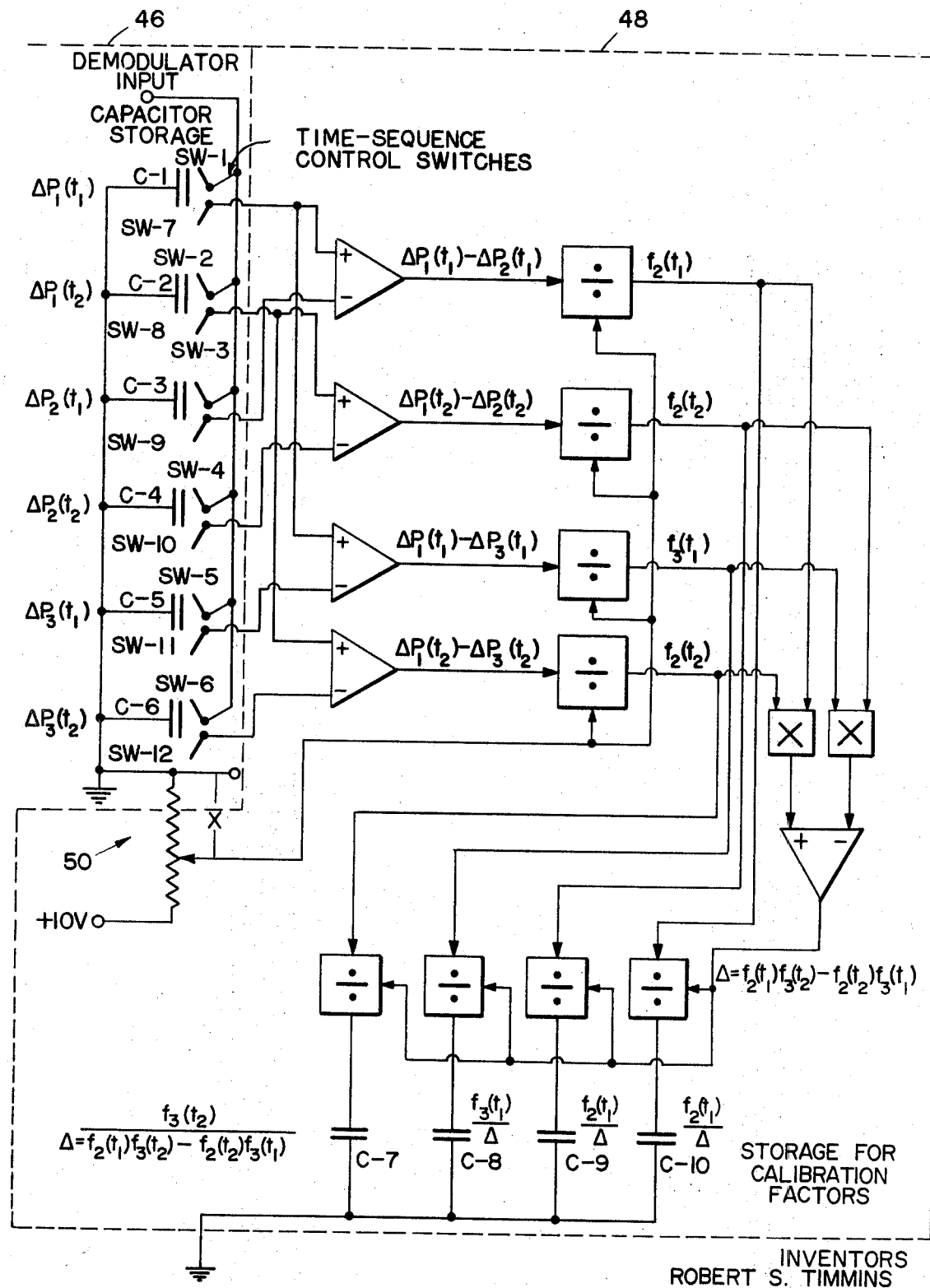
FIG. 3 is a schematic diagram of the storage and computation section showing the storage and calibration portions of the analog circuit.

FIG. 3 shows in schematic form an analog example of the storage and calibration portion of the storage and computation section. The storage portion is shown generally at 46 and the calibration portion is shown generally at 48. Within the storage portion 46 are capacitors C1 through C6 which receive and store the voltages from the demodulator 44 which is shown in FIG. 2. Also shown are switches SW1 through SW6 which automatically place the voltage charge on capacitors C1–C6 in timed sequence. Switches SW7 through SW12 are also in communication with the capacitors C1 through C6 and are timed to close automatically in order to discharge the stored voltages on the capacitors into the calibration portion 48.

In the calibration portion, modules for adding and substracting electrical charges are shown as triangles and modules for multiplying and dividing electrical charges are shown as squares. These modules for performing the arithmetic functions are various combinations of resistors and amplifiers. The specific arrangement and values of resistors and amplifiers within a module will not be elaborated upon since these techniques are well known to those skilled in the art.

Capacitors C7 through C10 are used to store the calibration factors as they are calculated. A variable resistor 50 is used to dial in or insert known values of the various flush gas compositions into the calibration circuit for use in the calculation as will be explained later.

Figure 4:
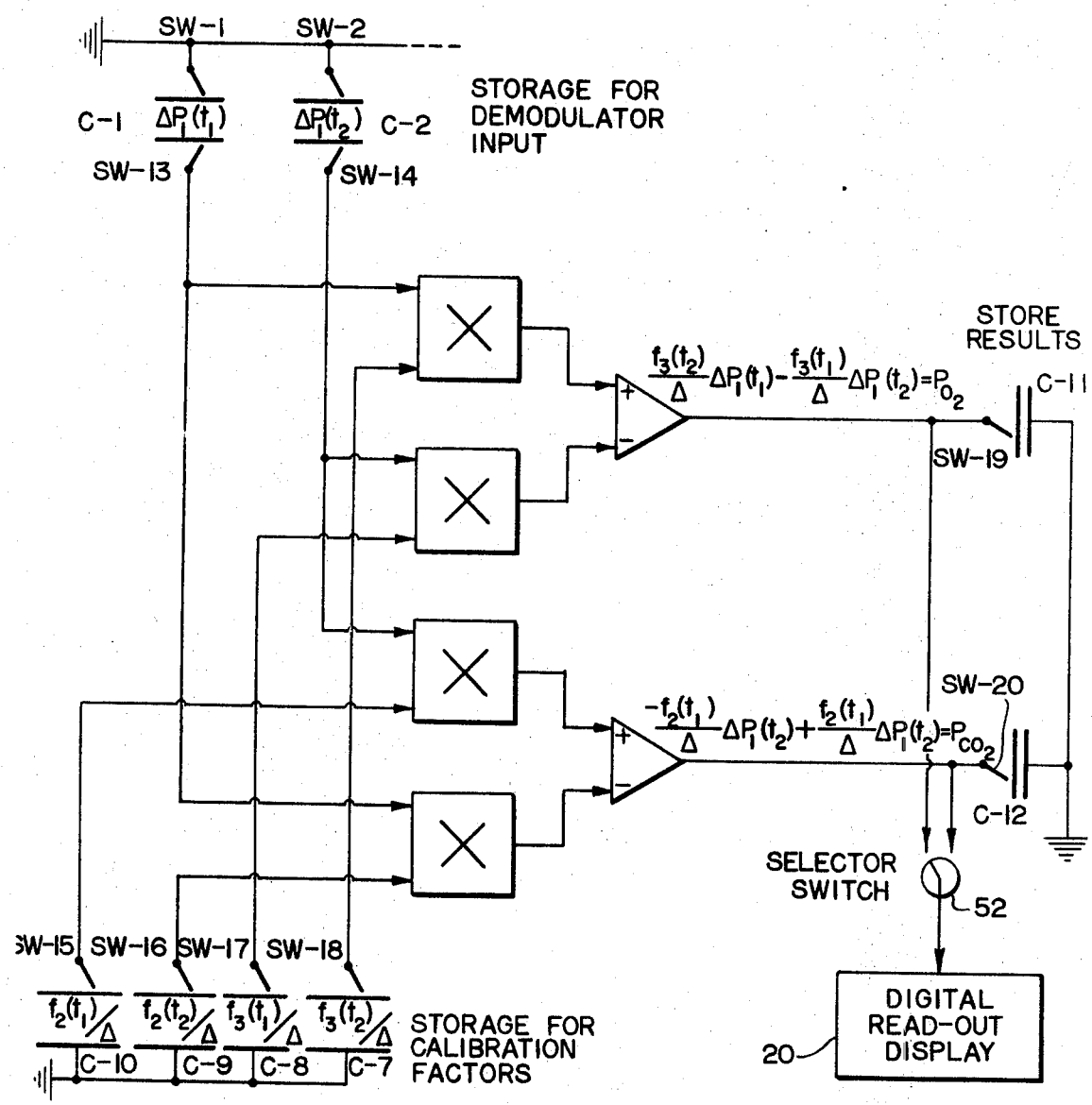
FIG. 4 is a schematic diagram of the storage and computation section showing the measurement portion of the analog circuit.

FIG. 4 shows the measurement portion of the analog circuit. Capacitors C1 and C2 are used to store the signals from the demodulator 44. The modules shown as triangles and squares are used to perform similar functions in a similar manner as previously described for the calibration portion. Capacitors C11 and C12 are used to store the signals (calculations) received from the measurement portion by the actuation of switches SW19 and SW20. Switches SW13 and SW14 when actuated transmit the stored charges from the capacitors C1 and C2 into the measurement portion while switches SW15 through SW18 function in a similar manner with capacitors C7 through C10. A selector switch 52 is used to transmit the desired signal from the measurement portion of the storage and computation section 16 to the digital readout device 20.

The timer 14 is used to control automatically the opening and closing of the valves V1, V2 and V3 and the solenoid valves S1 and S2 shown in FIG. 1. It is also used to open and close the switches SW1 through SW20 in timed sequence.

Before describing the operation of our invention in detail, the background of our invention will first be described.

It has been found that a major problem in blood-gas analysis is to separate the effects of the several gases which are present in the blood. As discussed above, the three gases normally found in the blood are nitrogen $N_2$ and carbon dioxide $CO_2$ and oxygen $O_2$. Assume for the purposes of developing the following mathematical expressions that the only gas that will diffuse through the membrane is the gas under investigation, carbon dioxide. The behavior of the pressure in the catheter chamber is related to the concentration of the gases in the blood. Thus, the basic formula where only one gas is diffusing through the membrane is $$P_t(t) = f(t)(P_b - P_o) \quad (1)$$

where:

$P_t(t)$—the total pressure change in the catheter chamber at a given time $(t)$. This change or increase is caused by the diffusion of the $CO_2$ through membrane and into the catheter chamber.

$f(t)$—is a time dependent function which function is the characteristic transient function of the carbon dioxide diffusion through the membrane.

$P_b$—is the partial pressure of the carbon dioxide in the blood; and $P_o$—is the partial pressure of the carbon dioxide in the catheter chamber at $t=0$.

To determine the value of the function $f(t)$ the following mathematical expressions are used.

$$P_{t1}(t_1) = f(t_1)(P_b - P_{o1}) \quad (2)$$
$$P_{t2}(t_1) = f(t_1)(P_b - P_{o2}) \quad (3)$$

Where $P_{t1}(t_1)$ is the pressure rise at a time $t_1$, after flushing with a gas with a partial pressure $P_{o1}$ of $CO_2$, $P_{t2}(t_1)$ is the pressure rise at a time $t_1$ after flushing with a gas with a partial pressure $P_{o2}$ of $CO_2$.

The symbols used in Equations 2 and 3 have the same meanings as they did in Equation 1. In Equation 2 a flush gas of known composition is used, say for example 10% carbon dioxide and 90% nitrogen. Therefore, the value in Equation 2 of $P_{o2}$ would be known. In Equation 3, a different value of $P_{o2}$ is used that is, there may be, for example, 20% carbon dioxide and 80% nitrogen in the known flush gas composition. Now Equations 2 and 3 are solved for the function $f(t_1)$ as follows:

$$f(t_1) = P_{t1}(t_1) - P_{t2}(t_1)(P_{o2} - P_{o1}) \quad (4)$$

The value of $t_1$ is fixed, the value of $P_{t1}(t_1)$ the total pressure increase for the first calibration run is measured and flush gas for the same run is known i.e. $P_{o1}$ the partial pressure of the $CO_2$ in the flush gas, (Equation 2), then $P_{t2}(t_1)$ and $P_{o2}$ are determined the same way. Therefore the value of $f(t_1)$ in Equation 4 can be determined.

Referring now to Equation 1, to determine the amount of carbon dioxide now in the blood stream, $$P_b = \frac{1}{f(t_1)} P_t(t_1) + P_o \quad (5)$$

$f(t)$ is known and $P_t(t)$ and $P_o$ are known from either calibration run 1 or 2. Hence, $P_d$ can be calculated. Additional, determinations may be made at any time by measuring the pressure rise at time $t_1$ with a flush gas of known composition $P_o \cdot f(t_1)$ is the permanent calibration constant for the patient-catheter system. Hence the blood gas pressure for each additional determination is given by Equation 1 rewritten as Equation 5. If more than one gas diffuses through the membrane, Equation (1) may be written generally as $$P(t) = \sum_{i=1}^{n} f_i(t)(P_{bi} - P_{oi}) \quad (6)$$

Where the term $f_i(t)(P_{bi} - P_{oi})$ is the pressure rise due to any one component diffusing into the catheter and the total pressure rise is the summation of the individual effects of each of the $n$ components dissolved in the fluid. $n+1$ flush gas samples of known composition are required to determine the calibration constants of the $n$ components. The ideal flush gas compositions are made up to include a mixture of a non-diffusing or relatively slow diffusing component and only one of the other gases present in the fluid in addition, one sample should contain only the non-diffusing species. The calculations are further simplified if $n$ of the $n+1$ flush gases contain the same quantity, X, of the second component. The following table represents the ideal flush gas sample compositions.

COMPOSITIONS
[Partial pressures]

| Flush gas sample No. | Component | | | | |
|---|---|---|---|---|---|
| | 1* | 2 | i | n | n+1 |
| 1 | 1 | 0 | 0 | 0 | 0 |
| 2 | 1-X | X | 0 | 0 | 0 |
| i | 1-X | 0 | X | 0 | 0 |
| n | 1-X | 0 | 0 | X | 0 |
| n+1 | 1-X | 0 | 0 | 0 | X |

The equations duplicating (6) for the $n+1$ calibration runs are $$\Delta P_1(t_1) = f_2(t_1)P_{b2} + \ldots f_i(t_1)P_{bi} + \ldots f_n(t_1)P_{bn} + f_{n+1}(t_1)P_{bn+1} \quad (7)$$

$$\Delta P_2(t_1) = f_2(t_1)(P_{b2}-X) + \ldots f_i(t_1)P_{bi} + \ldots f_n(t_1)P_{bn} + f_{n+1}(t_1)P_{bn+1} \quad (8)$$

$$\Delta P_i(t_1) = f_2(t_1)(P_{b2} + \ldots f_i(t_1)(P_{bi}-X) + \ldots f_n(t_1)P_{bn} + f_{n+1}(t_1)P_{bn+1} \quad (9)$$

$$\Delta P_n(t_1) = f_2(t_1)P_{b2} + \ldots f_i(t_1)P_{bi} + \ldots f_n(t_1)(P_{bn}-X) + f_{n+1}(t_1)P_{bn+1} \quad (10)$$

$$\Delta P_{n+1}(t_1) = f_2(t_1)P_{b2} + \ldots f_i(t_1)P_{bi} + \ldots f_n(t_1)P_{bn} + f_{n+1}(t_1)(P_{bn+1}-X) \quad (11)$$

From the above set of linear equations each calibration coefficient $f_i(t_1)$ is given by:

$$f_i(t_1) = \frac{\Delta P_1(t_1) - \Delta P_i(t_1)}{X} \quad (7)$$

for all $$2 \leq i \leq n+1 \quad (12)$$

If for each calibration run the pressure rise is measured at $n$ discrete time increments $t_j \leq 1 \leq j \; n$ then the calibration coefficient at each time increment for component $i$ is given by $$f_i(t_j) = \frac{\Delta P_1(t_j) - \Delta P_i(t_j)}{X} \quad (8)$$

$$2 \leq i \leq n+1$$
$$1 \leq j \leq n \quad (13)$$

The determination of each $f_i(t_1)$ concludes the calibration procedure. These constants are calculated and stored within the analog analyzer on the capacitor C7–C10 as shown in FIG. 3. The analog storage and calculation procedure is shown in FIG. 3 for a two component gas system with a non-diffusing third component.

The calculation of the gas partial pressure is made from the $n$ time samples of the pressure rise from calibration experiment 1 or any other determination run involving only the non-diffusing gas species. The $n$ time measurements of the pressure rise in a single run generate the following equations:

$$\Delta P_1(t_1) = f_2(t_1)P_{b2} + \ldots f_i(t_1)P_{bi} + \ldots f_n(t_1)P_{bn} + f_{n+1}(t_1)P_{bn+1} \quad (14)$$

$$\Delta P_1(t_2) = f_2(t_2)P_{b2} + \ldots f_i(t_2)P_{bi} + \ldots f_n(t_2)P_{bn} + f_{n+1}(t_2)P_{bn+1} \quad (15)$$

$$\Delta P_1(t_j) = f_2(t_j)P_{b2} + \ldots f_i(t_j)P_{bi} + \ldots f_n(t_j)P_{bn} + f_{n+1}(t_j)P_{bn+1} \quad (16)$$

$$\Delta P_1(t_n) = f_2(t_n)P_{b2} + \ldots f_i(t_n)P_{bi} + \ldots f_n(t_n)P_{bn} + f_{n+1}(t_n)P_{bn+1} \quad (17)$$

The above set of $n$ linear equations and the $n$ unknown blood gas pressures $P_{bi}(2 \leq i \leq n+1)$ may be solved by a suitable reduction technique (Gauss-Jordan). These are well known in the literature and need not be described herein. The analog analyzer shown in FIGS. 3 and 4 is designed or programmed to carry out the solutions of the above equations. The results are displayed on a digital voltmeter upon request.

The operation of our device will be described in particular for the determination of the quantitative level of carbon dioxide and oxygen in the blood stream. The mathematical expressions on which the diffusion of two gases into the catheter chamber is based are represented by Equations 7 through 17 where $n$ equals 2.

Referring now to FIG. 1 and in particular to the gas handling system 12, the cylinders 30, 32 and 34 are filled with various flush gas compositions as follows: Cylinder 30 is filled with 100% nitrogen, cylinder 32 is filled 100%−$x$% nitrogen wherein $x$ represents a fixed value of one of the gases diffusing through the membrane into the catheter chamber, such as 4% oxygen so that cylinder 32 contains 96% nitrogen and 4% oxygen. Cylinder 34 in a similar manner is filled with 100%−$x$% nitrogen where $x$ equals carbon dioxide so that cylinder 34 contains 96% nitrogen and 4% carbon dioxide. This value $x$ is a constant and is inserted or dialed into the storage and calibration portion. Specifically, the value of $x$ is multiplied times 760/100 which will equal millimeters. This value $x$ is a constant and is inserted or dialed into the storage and calibration portion by the variable resistor 50 shown in FIG. 3 to be used in subsequent calculations as will be explained later. Also the pressure regulator 40 and the flow control valve 42 are set prior to the actual calibration of the catheter and patient. The partial pressure of the carbon dioxide or oxygen in the flush gas is less than the carbon dioxide or oxygen in the blood stream to insure that the diffusion through the catheter membrane will be into the catheter chamber thereby increasing the pressure.

After the flow control valve and the pressure regulator have been adjusted and the cylinders 30, 32 and 34 filled with the various flush gas compositions and the value of the partial pressure of the gases under investigation in the flush gas has been dialed into the storage and computation portion the device is ready for actual use.

With the catheter inserted therein as shown in FIG. 2, the following sequential opening and closing of valves as described is automatically controlled by the timer 14. First, valve V1 is opened and then valves S1 and S2 are opened simultaneously. This allows the flush gas from cylinder 30 to flow through the valve S1 and inlet tube 26 into the catheter chamber 24 and out tube 28 and then out the vent of the downstream side of solenoid valve S2. After a short period of time, say for example five seconds, valve S1 is closed and then valve S2 is closed sealing the flush gas in chamber 24. At this time the carbon dioxide and oxygen in the blood stream commences to diffuse through the membrane walls of the capillary tubes 22 and into the catheter chamber 24, causing the pressure in the catheter chamber to increase with time. This increase in pressure is received by the transducer 36 transmitted to the demodulator 44 which signal is then sent to the storage and computation section 16.

At a given time ($t_1$) say for example 30 seconds, the switch SW1 shown in FIG. 3 is actuated and the voltage at that time is stored on the capacitor C1. At $t_2$, say after 60 seconds, the switch SW2 is closed and the voltage corresponding to the pressure at that time is stored on the capacitor C2. These values $\Delta P_1(t_1)$ and $\Delta P_1(t)_2$ shown in FIG. 3 are represented in the left hand side of the Equations 14 and 15.

Valve V1 is closed. Valves V2 and V7 are opened and the flush gas from cylinder 32 purges the system of the residual flush gas from cylinder 30. Valve V7 is then closed. As described for the introduction of the flush gas from cylinder 30, the same sequence of steps is now followed and the pressure determination at ($t_1$) is made. Switch SW3 is actuated and places the charge on capacitor C3 and in a like manner at $t_2$ the valve received from the demodulator is placed on capacitor C4 by switch SW4. Thus, values $\Delta P_2(t_1)$ and $\Delta P_2(t_2)$ are now stored in the storage and calibration portion. Further as described above the system is now purged with the flush gas composition from cylinder 34. Readings are taken at $t_1$ and the switch SW6 is actuated placing the charge on capacitor C6.

With all the values stored on the capacitors C1 through C6, the switches SW7, through SW12 are automatically actuated and stored charges on the capacitors are then discharged into the calculation portion and through the modules of the analog computer. As it is clearly shown in FIG. 3, the calculations are then carried out and the calibration factors are stored on capacitors C7 through C10. These calibration factors are represented by Equations 7 through 11.

Now that the calibration of the catheter for the particular patient has been completed, the measurement cycle commences. Referring to FIGS. 1 and 4, valves V1, S1 and S2 are open simultaneously and the flush gas composition from cylinder 30 flows through the catheter chamber. Then valves S1 and S2 are closed in timed sequence. Again as before, the pressure in the catheter chamber, begins to increase. At the end of $t_1$ the value from the demodulator is stored on capacitor $C_1$ by switch SW1. At $t_2$ the value received from the transducer is stored on the capacitor C2 by switch SW2. Now switches SW13 through SW20 are actuated. This causes the values of $\Delta P_1(t_1)$ and $\Delta P_1(t_2)$ to be transferred into the measurement portion as well as the values of the calibration factors previously stored on the capacitors C7 through C10. These calculations are then performed as shown in FIG. 4 and as represented by Equations 14 through 17. The value of the oxygen $P_{o2}$ is stored on capacitor C11 in the value of the carbon dioxide $P_{co2}$ is stored on capacitor C12.

Consequently the value of either the carbon dioxide or the oxygen in the blood stream can now be read directly by actuating the selector switch 52 as shown in FIG. 4. The signal from the capacitor either C11 or C12 is then relayed to the digital readout where the signal is converted to a digital display. The digital display is designed to readout directly in millimeters. The measurement cycle may be repeated as often as desired, using the stored values of the calibration factors.

In the analysis of dissolved gases in the blood stream the patient is often undergoing surgery and in order to make sufficiently accurate determinations of gas composition the pressure rise must be measurable and significant differences must be observed when the catheter is flushed with gases of different compositions. This requires that the walls of the catheter be thin and a large permeable surface be present within the chamber. If the catheter wall is too thin extraneous pulses in the fluid system (e.g. chest cavity pulsations and heart beat in blood gas analysis, pump or compressor pulsations in a moving fluid analysis) tend to compress or expand the catheter chambers thus producing erroneous pressure readings.

Accordingly, in our preferred embodiment as described by using capillarly tubes the foregoing difficulties are avoided and the arrangement provides for a greater surface area and more mechanical strength.

However, in measuring dissolved gases in fluid streams, wherein the sensitive readings required in blood gas analysis are not required it is apparent other catheter designs, such as a probe consisting of a cylindrical tube with walls made of a membrane material, may be used.

Our device has been described in particular as applied to the in vivo quantitative measurement of dissolved oxygen and carbon dioxide in arterial or venous blood. It is obvious that our invention may be used to measure dissolved gas in any fluid stream such as carbon dioxide in beer and air pollutents like carbon monoxide, sulfur dioxide and oxides of nitrogen or other contaminants in the atmosphere. Also depending upon the system in which our invention is used, the type membrane will vary depending upon the diffusion characteristics of the gas under investigation. Obviously many membranes such as fluorocarbons like Teflon, cellulose esters like cellulose acetate, etc. may also be used. Further the specific arrangement of cylinders and valves for handling the flush gas compositions is merely one of convenience as is the use of an analogue computer. The device can be easily adapted to function with other calculating equipment such as a digital computer. In addition, the calibration constant for each gas analyzed may be determined by prior art methods and our device used to monitor on a continuous intermittent basis the fluid stream for a particular one or more components.

What is claimed is:

1. A method of determining the quantitative amount of one or more gas components in a fluid stream which method comprises in sequence:
   (a) flowing a fluid stream to be analyzed into contact with a catheter device having a semi-permeable membrane which defines a chamber in the catheter, the membrane characterized by having a significant rate of diffusion for at least one component of the fluid stream which is to be analyzed;
   (b) introducing a flush gas stream of known composition and pressure into said chamber, which flush gas contains at least one of the gas components in the fluid stream;
   (c) isolating said flush gas of known composition in said chamber;
   (d) determining the pressure at given times, the number of pressure determinations so made to be at least equal to the number of gas components to be analyzed in the fluid stream;
   (e) removing the flush gas from the chamber;
   (f) repeating steps (b), (c), (d) and (e) each time with a flush gas of known composition and pressure to obtain a series $(n+1)$ of sets of pressure determinations at given times;
   (g) converting the pressure determinations into signals;
   (h) calculating from the said signals of the pressure determinations and the known fluid compositions used in steps (b), (c), (d), (e) and (f), the quantitative composition of all of the gas components which have a significant rate of diffusion through the permeable membrane and which are present in the fluid stream to be analyzed to obtain one or more calibration factors for the gases to be analyzed in said fluid stream; and
   (i) repeating steps (b), (c), (d) and (g) and from the pressure determinations made and the calibration factors previously obtained in step (h) determining the quantitative amount of one or more components in the fluid stream to be analyzed.

2. The method of claim 1 wherein the fluid stream is a blood stream, the gas components to be analyzed are selected from the group consisting of oxygen, carbon dioxide, and anesthetic gases and wherein the gas component which does not have a significant rate of diffusion is nitrogen.

3. The method of claim 1 wherein the semi-permeable membrane is a silicone rubber membrane.

4. The method of claim 1 which includes diffusing the gas component from the fluid stream into the catheter chamber to increase the pressure within the chamber.

5. The method of claim 1 which includes the steps of converting such pressure determinations into voltage; storing said voltages until needed for subsequent calculations; and displaying the quantitative amount of the components in the fluid stream.

6. A gas analysis device to determine the quantitative amount of one or more gas components in a fluid stream which apparatus comprises in combination:
   (a) a catheter which includes a fluid permeable membrane which membrane permits the diffusion of one or more gas components therethrough and which membrane defines a chamber;
   (b) means to introduce a flush gas into said chamber;
   (c) means to sense and means to convert the pressure in the chamber at a given time into an electrical signal;
   (d) timing means to determine and control when said pressure determinations are made;
   (e) means to isolate in sequence a number of flush gases of known pressure and composition in said chamber for said pressure determinations;
   (f) means to remove the flush gases from the chamber after said determinations;
   (g) computer means responsive to the sensing means and the timing means which includes:
      (1) means to store the signals received from the sensing means and then process the signals into a calibration factor for said membrane and said fluid stream system;
      (2) means to store said calibration factor;
      (3) means to process the signals employing said calibration factors from each pressure determination and fluid composition to determine the composition of the fluid components in the fluid stream to be analyzed which components diffuse through the membrane into said chamber at a significant rate of diffusion; and
      (4) means to store the value of the fluid composition of the flush gases; and
   (h) means to display the quantitative amount of the gas component in the fluid stream.

7. The device of claim 6 wherein the fluid permeable membrane includes a plurality of capillary tubes.

8. The device of claim 6 wherein the means to convert the pressure into an electrical signal includes a transducer, and the means to process and store the signals received from the transducer includes an analog computer.

9. The device of claim 6 wherein the fluid permeable membrane is a silicone-rubber membrane.

10. The device of claim 6 wherein the means to display the quantitative amount of the gas components in the gas stream includes a visual readout device.

11. The device of claim 6 wherein the catheter comprises a silicone membrane coated with a fluorocarbon material.

12. A gas analysis device to determine the amount of carbon dioxide and oxygen in a blood stream which comprises in combination:
   (a) a catheter which includes a plurality of capillary tubes therein for the passage of the blood stream therethrough a jacket about said bundle of capillary tubes and sealingly engaged at either end thereof with said tubes which jacket defines a chamber between the outer surfaces of the capillary tubes and the inner surface of the jacket;
   (b) means to introduce and remove the blood stream into and from the capillary tubes;
   (c) control means to introduce and remove the flush gas stream into and from the chamber;
   (d) a transducer in communication with said chamber responsive to pressure changes within said chamber to convert said pressure changes into electrical signals and transmit said signals to a computer;
   (e) a computer responsive to the signals from the transducer which comprises:
      (1) capacitors to store said signals;
      (2) a first analog circuit to process said signals to determine calibration factors;
      (3) capacitors to store said calibration factors;
      (4) a second analog circuit to store signals from the transducer and to process said signals with said calibration factors to determine the value of the quantitative level of the components in the fluid stream;
      (5) capacitors to store the values of the quantitative levels of the components in the fluid stream;

(f) a digital readout device in communication with said computer to display the quantitative levels of the components in the fluid stream; and (g) a timer in communication with the computer and the control means whereby the sequential introduction and removal of the flush gases into the catheter chamber, the pressure determination, and the operation of the computer are controlled in timed sequence.

References Cited

UNITED STATES PATENTS

| | | | |
|---|---|---|---|
| 2,946,665 | 7/1960 | Skeggs | 23—230 |
| 3,029,682 | 4/1962 | Wood | 128—2 XR |
| 3,111,390 | 11/1963 | Taylor | 23—253 |
| 3,259,124 | 7/1966 | Hillier | 128—2.1 |
| 3,443,904 | 5/1969 | Hill | 23—253 |

OTHER REFERENCES

Folkman, J. et al., Science, vol. 154 October-November, 1966, pp. 148–149.

Gotoh, F. et al., Medical Research Engineering, 2nd quarter, 1966, pp. 13–19.

RICHARD A. GAUDET, Primary Examiner

K. L. HOWELL, Assistant Examiner

U.S. Cl. X.R.

23—232, 254; 73—23